(12) United States Patent
Omiya

(10) Patent No.: US 8,903,077 B2
(45) Date of Patent: Dec. 2, 2014

(54) ASSIGNMENT MANAGEMENT APPARATUS, ASSIGNMENT MANAGEMENT METHOD, AND ASSIGNMENT MANAGEMENT PROGRAM

(71) Applicant: Toshiyuki Omiya, Tokyo (JP)

(72) Inventor: Toshiyuki Omiya, Tokyo (JP)

(73) Assignee: P&W Solutions Co., Ltd., Tokyo (JP)

(*) Notice: Subject to any disclaimer, the term of this patent is extended or adjusted under 35 U.S.C. 154(b) by 66 days.

(21) Appl. No.: 13/681,117

(22) Filed: Nov. 19, 2012

(65) Prior Publication Data
US 2013/0136251 A1    May 30, 2013

(30) Foreign Application Priority Data
Nov. 28, 2011  (JP) .................................. 2011-258564

(51) Int. Cl.
*H04M 3/00*   (2006.01)
*H04M 5/00*   (2006.01)
*H04M 3/51*   (2006.01)

(52) U.S. Cl.
CPC ...... *H04M 3/5175* (2013.01); *H04M 2203/402* (2013.01)
USPC .............. 379/265.05; 379/265.02; 379/265.1

(58) Field of Classification Search
CPC .. H04M 3/523; H04M 3/5233; H04M 3/5232
USPC .............. 379/265.02, 265.03, 265.05, 265.1, 379/266.08
See application file for complete search history.

(56) References Cited

U.S. PATENT DOCUMENTS

2003/0215083 A1* 11/2003 McPartlan et al. ........ 379/265.02
2005/0080637 A1*  4/2005 Gruia et al. ...................... 705/1

FOREIGN PATENT DOCUMENTS

JP  2005-004386  1/2005

* cited by examiner

*Primary Examiner* — Nafiz E Hoque
(74) *Attorney, Agent, or Firm* — SoCal IP Law Group LLP; Steven C. Sereboff; John E. Gunther

(57) ABSTRACT

An assignment management apparatus includes: a traffic acquisition unit that acquires traffic per unit time; a storage unit that stores traffic per unit time when an operator is assigned, as traffic upon assignment, in association with the operator and an assignment sequence, and stores traffic per unit time when the assignment is canceled, as traffic upon cancellation; a processing capacity calculation unit that calculates difference between the traffic upon assignment of the operator and traffic upon assignment of an operator whose assignment sequence is next to the operator, as processable traffic of operators; and a determination unit that determines that it is timing to cancel assignment of an operator, in a case in which the traffic per unit time is decreased by the processable traffic calculated for the operator from the traffic upon cancellation.

7 Claims, 6 Drawing Sheets

FIG. 2

ASSIGNMENT TABLE

| OPERATOR ID | ASSIGNMENT SEQUENCE | TRAFFIC UPON ASSIGNMENT | ASSIGNMENT CANCELLATION |
|---|---|---|---|
| A | 1 | 123 | NOT YET |
| B | 2 | 157 | NOT YET |
| C | 3 | 162 | DONE |
| D | 4 | 172 | NOT YET |
| ... | ... | ... | ... |

FIG. 3

PROCESSING CAPACITY TABLE

| OPERATOR ID | TRAFFIC UPON ASSIGNMENT | TRAFFIC UPON NEXT ASSIGNMENT | PROCESSING CAPACITY |
|---|---|---|---|
| A | 123 | 157 | 34 |
| B | 157 | 162 | 5 |
| C | 162 | 172 | 10 |
| D | 172 | – | – |
| ... | ... | ... | ... |

FIG. 4

| CANCEL | CANCELLATION TIMING | ID | GROUP | SEQUENCE | TRAFFIC UPON ASSIGNMENT | PROCESSING CAPACITY | STATUS |
|---|---|---|---|---|---|---|---|
| ☐ |  | A |  | 1 | 123 | 34 | CURRENTLY ASSIGNED |
| ☐ |  | B |  | 2 | 157 | 5 | CURRENTLY ASSIGNED |
| ☑ |  | C | ○ | 3 | 162 | 10 | CURRENTLY ASSIGNED |
| ☑ | ○ | D |  | 4 | 172 |  | CURRENTLY ASSIGNED |

EXECUTE    CANCEL

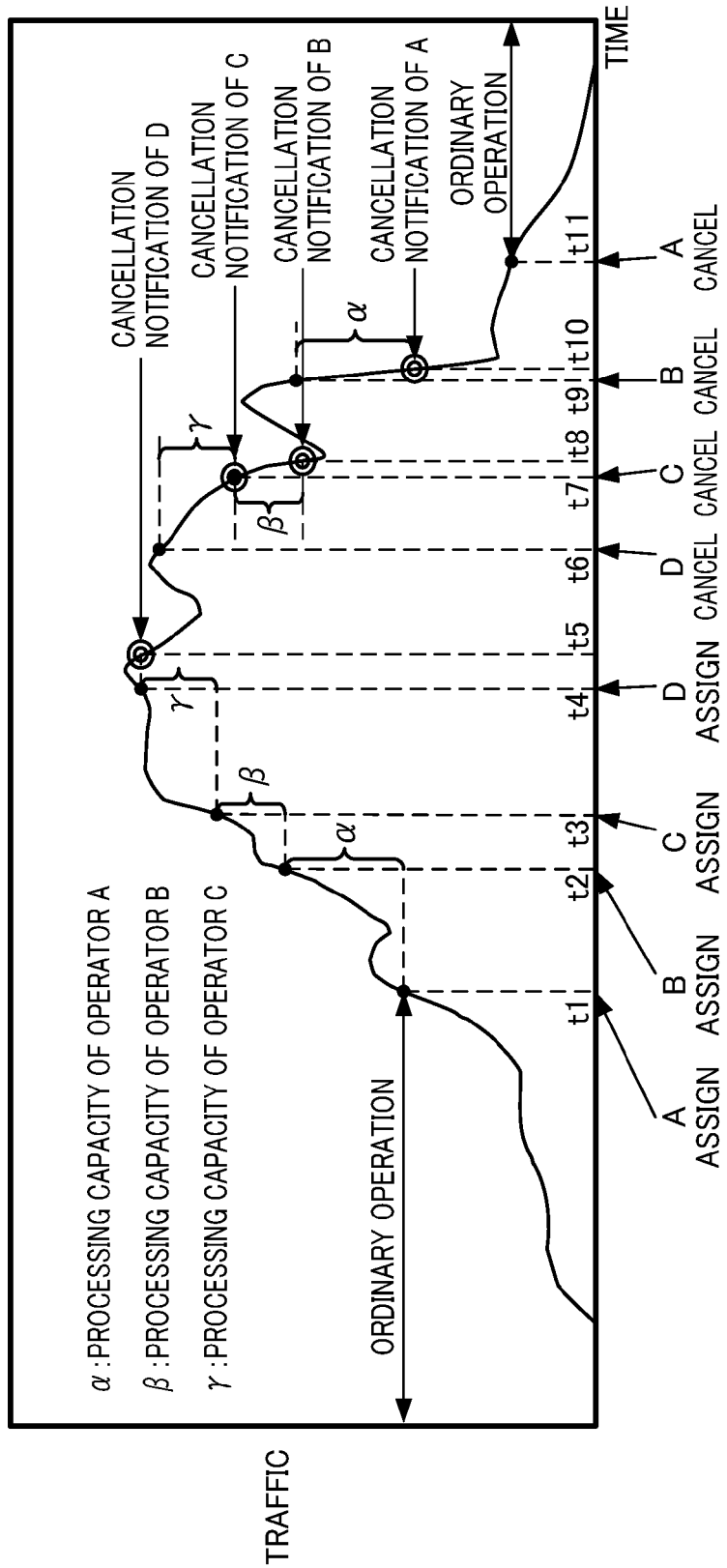

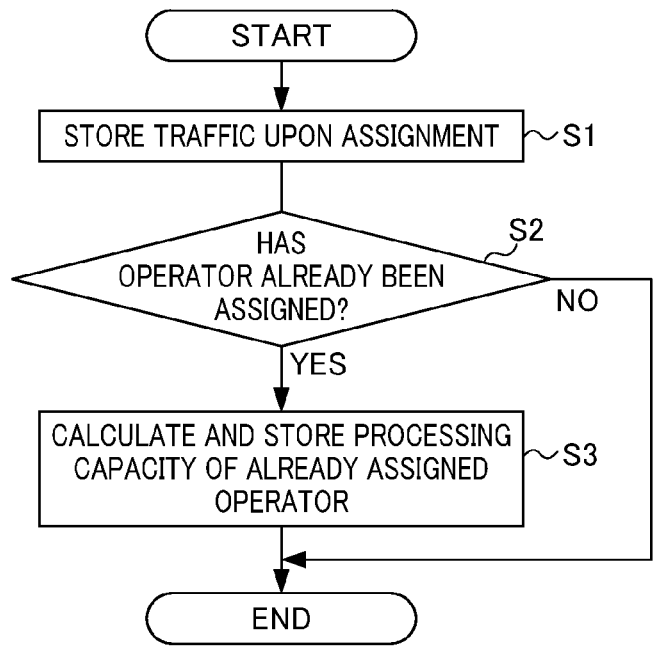
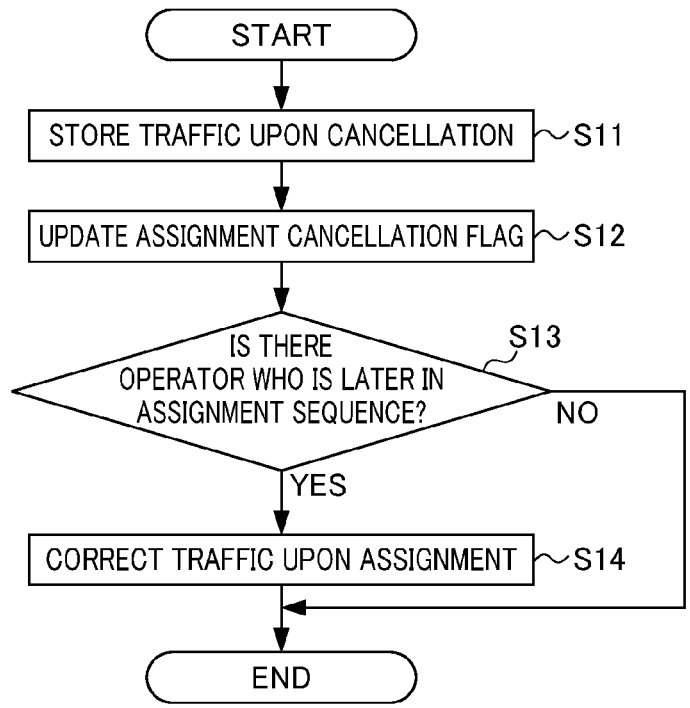

ASSIGNMENT MANAGEMENT APPARATUS, ASSIGNMENT MANAGEMENT METHOD, AND ASSIGNMENT MANAGEMENT PROGRAM

This application is based on and claims the benefit of priority from Japanese Patent Application No. 2011-258564, filed on 28 Nov. 2011, the content of which is incorporated herein by reference.

BACKGROUND OF THE INVENTION

1. Field of the Invention

The present invention relates to an assignment management apparatus, an assignment management method, and an assignment management program, for operators at a contact center.

2. Related Art

Conventionally, for the purpose of improving the work efficiency or the like of users at an office, a general manager sets seating arrangement that satisfies more seating arrangement conditions, by considering seating arrangement conditions for all the users (for example, see Japanese Unexamined Patent Application, Publication No. 2005-4386).

However, at a contact center, incoming traffic fluctuates every moment, and the traffic drastically changes depending on occurrence of various events in many cases. Accordingly, the manager copes with the fluctuating traffic by changing the number of assigned operators, in order to maintain the quality of services such as latency or a response rate. For example, in a case in which the traffic is increasing, the manager assigns temporary operators in addition to previously scheduled operators.

SUMMARY OF THE INVENTION

Incidentally, after assigning the temporary operators to cope with the increasing traffic, in a case in which the traffic decreases, it is desirable to cancel the assignment of the temporary operators at appropriate timing, in order to maintain an appropriate number of operators. However, it has been difficult to determine the timing to cancel the assignment of the excessive number of operators.

An object of the present invention is to provide an assignment management apparatus, an assignment management method, and an assignment management program, all of which are capable of determining appropriate timing to cancel temporary assignment.

According to the present invention, means as follows is provided for solving the problems.

A first aspect of the present invention is an assignment management apparatus that includes: a traffic acquisition unit that acquires traffic per unit time at a contact center; a first storage unit that stores traffic per unit time when an operator is temporarily assigned, as traffic upon assignment, in association with the operator and an assignment sequence; a second storage unit that stores traffic per unit time when assignment of any operator is canceled, as traffic upon cancellation; a processing capacity calculation unit that calculates difference between the traffic upon assignment of the operator and traffic upon assignment of an operator whose assignment sequence is next to the operator, as processable traffic that indicates processing capacity of operators; and a determination unit that determines that it is timing to cancel assignment of an operator, in a case in which the traffic per unit time is decreased by the processable traffic calculated for the operator from the traffic upon cancellation.

According to such a configuration, the assignment management apparatus can calculate the processable traffic for each operator, and can determine appropriate timing to cancel the assignment of the temporary operators, based on the processable traffic and the amount of change in the traffic per unit time.

A second aspect of the present invention is the assignment management apparatus as recited in the first aspect, in which the determination unit determines timing to cancel assignment in a sequence reverse to the assignment sequence.

According to such a configuration, the assignment management apparatus determines the timing to cancel the assignment in the sequence reverse to the assignment sequence, and thus can notify the timing to cancel the temporary assignment in an appropriate sequence that is determined in advance.

A third aspect of the present invention is the assignment management apparatus as recited in the first or second aspect, and in a case in which traffic per unit time of an operator, whose processable traffic is not calculated, falls below the traffic upon assignment, the determination unit determines that it is timing to cancel assignment of the operator.

According to such a configuration, regarding an operator whose processable traffic is not calculated yet, the assignment management apparatus can determine appropriate timing to cancel the temporary assignment of this operator, based on the traffic upon assignment.

A fourth aspect of the present invention is the assignment management apparatus as recited in any of the first to third aspects, further including a third storage unit that stores current processable traffic by updating processable traffic calculated in the past, each time the processing capacity calculation unit calculates the processable traffic, in which the determination unit determines timing to cancel assignment of an operator, based on the current processable traffic stored in the third storage unit.

According to such a configuration, the assignment management apparatus stores the processable traffic that is calculated. Therefore, even in a case in which the processable traffic is not calculated afresh after assigning an operator last time, the assignment management apparatus can determine appropriate timing to cancel the temporary assignment of the operator, by using the processable traffic calculated in the past.

A fifth aspect of the present invention is the assignment management apparatus as recited in any of the first to fourth aspects, and in a case in which assignment of an operator is canceled, who is other than an operator being the last in the assignment sequence, the first storage unit updates traffic upon assignment, which is stored in association with an operator whose processable traffic is not calculated, by subtracting processable traffic of the operator whose assignment is canceled.

According to such a configuration, in a case in which assignment of an operator is canceled, who is other than an operator being the last in the assignment sequence, the assignment management apparatus can correct the traffic upon assignment by subtracting the processable traffic of the operator whose assignment was canceled, regarding an operator who is later in the assignment sequence than the operator whose assignment was canceled, particularly regarding the last operator whose processable traffic is not calculated yet. This improves the accuracy of calculating the processable traffic later.

A sixth aspect of the present invention is the assignment management apparatus as recited in any of the first to fifth aspects, and in a case in which a plurality of operators are concurrently assigned as a group, the traffic upon assignment and the processable traffic are associated with this group, and the determination unit determines the timing to cancel the assignment of the group, based on the processable traffic associated with this group.

According to such a configuration, the assignment management apparatus can calculate the processable traffic for each of the groups composed of the plurality of operators, and can determine appropriate timing to cancel the temporary assignment of the groups, based on the processable traffic and the amount of change in the traffic per unit time.

A seventh aspect of the present invention is an assignment management method for a computer to manage assignment of operators at a contact center, and the method includes: a traffic acquisition step of acquiring traffic per unit time; a first storage step of storing traffic per unit time when an operator is temporarily assigned, as traffic upon assignment, in association with the operator and an assignment sequence; a second storage step of storing traffic per unit time when assignment of any operator is canceled, as traffic upon cancellation; a processing capacity calculation step of calculating difference between the traffic upon assignment of the operator and traffic upon assignment of an operator whose assignment sequence is next to the operator, as processable traffic that indicates processing capacity of operators; and a determination step of determining that it is timing to cancel assignment of an operator, in a case in which the traffic per unit time is decreased by the processable traffic calculated for the operator from the traffic upon cancellation.

According to such a configuration, effects similar to those of the first aspect can be expected by causing the computer to execute the assignment management method.

An eighth aspect of the present invention is an assignment management program causing a computer to manage assignment of operators at a contact center, and the program causes the computer to execute: a traffic acquisition step of acquiring traffic per unit time; a first storage step of storing traffic per unit time when an operator is temporarily assigned, as traffic upon assignment, in association with the operator and an assignment sequence; a second storage step of storing traffic per unit time when assignment of any operator is canceled, as traffic upon cancellation; a processing capacity calculation step of calculating difference between the traffic upon assignment of the operator and traffic upon assignment of an operator whose assignment sequence is next to the operator, as processable traffic that indicates processing capacity of operators; and a determination step of determining that it is timing to cancel assignment of an operator, in a case in which the traffic per unit time is decreased by the processable traffic calculated for the operator from the traffic upon cancellation.

According to such a configuration, effects similar to those of the first aspect can be expected by causing the computer to execute the assignment management program.

According to the present invention, a manager can perceive appropriate timing to cancel temporary assignment.

BRIEF DESCRIPTION OF THE DRAWINGS

FIG. 2 is a diagram showing an assignment table according to the embodiment;

FIG. 3 is a diagram showing a processing capacity table according to the embodiment;

FIG. 4 is a diagram showing an example of a screen displayed on a manager terminal according to the embodiment;

FIG. 5 is a graphic chart showing change in traffic per unit time, and timing of assignment and cancellation of operators, according to the embodiment;

FIG. 6 is a flowchart showing a flow of processing when an instruction input for assigning an operator is accepted, in the assignment management apparatus according to the embodiment;

FIG. 7 is a flowchart showing a flow of processing when an instruction input for canceling assignment of an operator is accepted, in the assignment management apparatus according to the embodiment.

DETAILED DESCRIPTION OF THE INVENTION

Descriptions are hereinafter provided for an embodiment of the present invention.

An assignment management apparatus 1 according to the present embodiment determines timing to cancel assignment of an operator who was temporarily assigned by a manager at a contact center, and notifies the manager of the timing.

Figure 1:
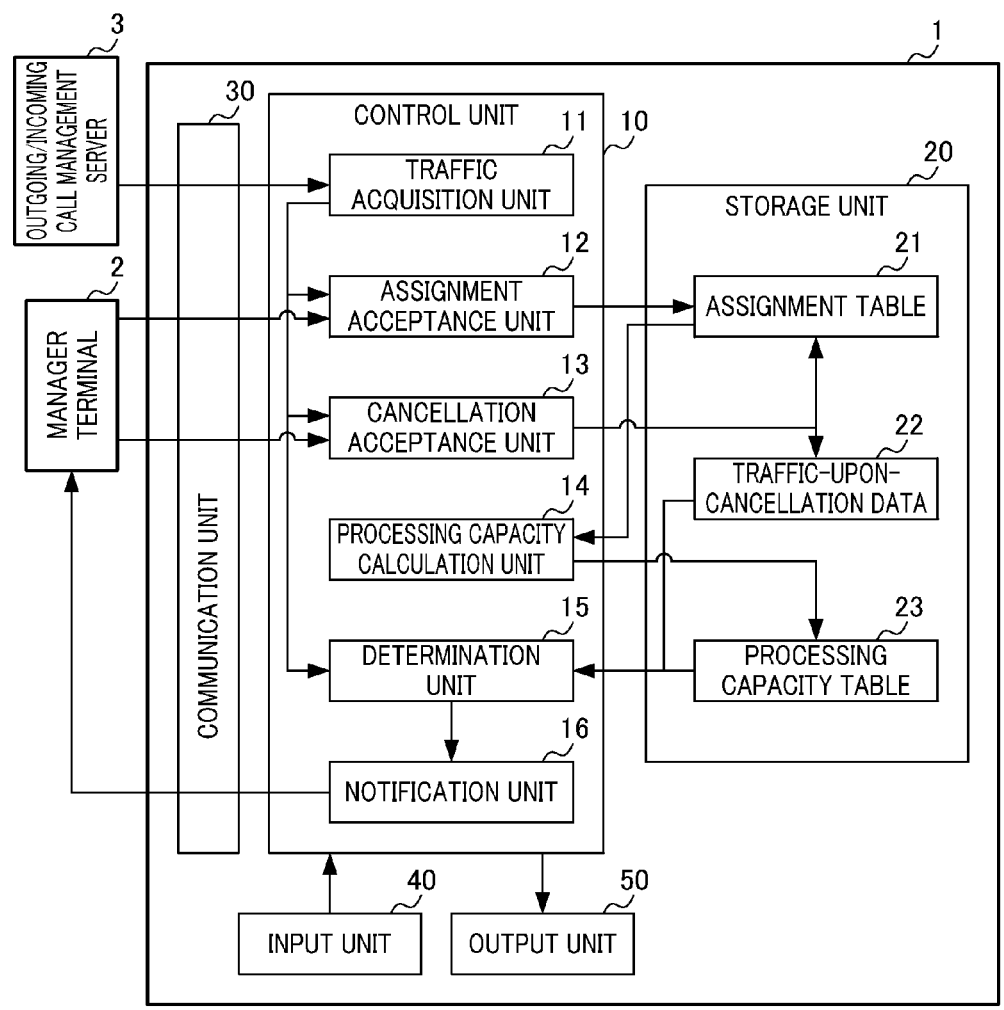
FIG. 1 is a block diagram showing a functional configuration of an assignment management apparatus according to an embodiment.

FIG. 1 is a block diagram showing a functional configuration of the assignment management apparatus 1 according to the present embodiment.

The assignment management apparatus 1 includes a control unit 10, a storage unit 20, a communication unit 30, an input unit 40, and an output unit 50.

The control unit 10 controls the entirety of the assignment management apparatus 1, and appropriately reads and executes various programs stored in the storage unit 20, thereby collaborating with the aforementioned hardware units, and implementing various functions according to the present embodiment. The control unit 10 may be a central processing unit (CPU). Functions of each part provided to the control unit 10 will be described later.

The storage unit 20 is a storage area that stores various programs and a variety of data for causing a group of hardware units to function as the assignment management apparatus 1, in which the storage unit 20 may be a hard disk drive (HDD). More specifically, the storage unit 20 stores a program (an assignment management program) that is executed by the control unit 10 to implement various functions of the present embodiment.

As a first storage unit, the storage unit 20 stores an assignment table 21 that stores traffic per unit time when an operator is temporarily assigned (traffic upon assignment), in association with the operator and an assignment sequence of the operator. As a second storage unit, the storage unit 20 stores traffic-upon-cancellation data 22 that indicates the latest value among traffic per unit time when assignment of any operator is canceled (traffic upon cancellation). As a third storage unit, the storage unit 20 stores a processing capacity table 23 that stores processable traffic, which indicates a processing capacity of each operator.

FIG. 2 is a diagram showing the assignment table 21 according to the present embodiment.

For each operator ID for identifying an operator or a group composed of a plurality of operators, the assignment table 21 stores an assignment sequence, traffic upon assignment per unit time, and an assignment cancellation flag (done/not yet) that indicates whether assignment was canceled.

FIG. 3 is a diagram showing the processing capacity table 23 according to the present embodiment.

For each operator ID as described above, the processing capacity table 23 stores: traffic per unit time when the operator is assigned; traffic per unit time when an operator being the next in the assignment sequence is assigned (traffic upon next assignment); and processable traffic (processing capacity) that is calculated by a processing capacity calculation unit 14 (to be described later).

The communication unit 30 is a network adapter used by the assignment management apparatus 1 to transmit and receive data to and from other apparatuses. The communication unit 30 performs data communication through a network with a manager terminal 2 and an outgoing/incoming call management server 3.

The input unit 40 is an interface device that accepts an instruction input from an operator into the assignment management apparatus 1. The input unit 40 is configured by, for example, a keyboard, a mouse, a touch screen, etc.

The output unit 50 includes a display unit that displays a screen for accepting an input of data from the operator, and displays a screen for showing results of processing by the assignment management apparatus 1. The output unit 50 may also include a display unit such as a cathode ray tube (CRT) display or a liquid crystal display (LCD), as well as other various output units such as a printer.

Next, detailed descriptions are provided for functions of the control unit 10.

The control unit 10 includes a traffic acquisition unit 11, an assignment acceptance unit 12, a cancellation acceptance unit 13, a processing capacity calculation unit 14, a determination unit 15, and a notification unit 16. Each of those units is a functional block that is implemented by executing the assignment management program.

The traffic acquisition unit 11 periodically acquires traffic per unit time from the outgoing/incoming call management server 3 such as a PBX (Private Branch eXchange) server or a CTI (Computer Telephony Integration) server, which manages outgoing/incoming calls at a contact center.

The assignment acceptance unit 12 accepts an instruction input from the manager terminal 2 for temporarily assigning an operator, and updates the assignment table 21 by using traffic per unit time at this time as the traffic upon assignment.

The cancellation acceptance unit 13 accepts an instruction input from the manager terminal 2 for canceling assignment of an operator, and stores traffic per unit time at this time as the traffic-upon-cancellation data 22. Regarding the operator whose assignment was canceled by the instruction, the cancellation acceptance unit 13 updates an assignment cancellation flag in the assignment table 21 from "not yet" to "done".

At this time, in general, the assignment is canceled from the lastly assigned operator in sequence, but an actually acceptable sequence is not limited thereto. In a case in which assignment of an operator, who is other than the operator being the last in the assignment sequence, is canceled among operators who are already assigned, the traffic upon assignment, which is stored in the assignment table 21 and the processing capacity table 23 in association with operators whose processable traffic is not calculated yet, is updated by subtracting the processable traffic of this operator whose assignment is canceled. As a result, in a case in which an operator is additionally assigned again, the processable traffic is appropriately calculated.

As the processable traffic that indicates the processing capacity of operators, the processing capacity calculation unit 14 calculates difference between the traffic upon assignment of this operator and the traffic upon assignment of an operator being the next to this operator in the assignment sequence, and stores the difference into the processing capacity table 23.

Here, each time the processable traffic is calculated for an identical operator, the processing capacity calculation unit 14 updates the processable traffic calculated in the past, and stores the latest processable traffic into the processing capacity table 23.

In a case in which the traffic per unit time acquired by the traffic acquisition unit 11 is decreased by the latest processable traffic of any operator stored in the processing capacity table 23 from the traffic-upon-cancellation data 22, the determination unit 15 determines that it is the timing to cancel the assignment of this operator.

The determination unit 15 selects the temporarily assigned operators in a sequence reverse to the assignment sequence accepted by the assignment acceptance unit 12, and determines the timing to cancel the assignment. At this time, regarding an operator whose processable traffic is not calculated in the past and is not stored in the processing capacity table 23, in a case in which the traffic per unit time of the operator falls below the traffic upon assignment, the determination unit 15 determines that it is the timing to cancel the assignment of this operator.

In a case in which a plurality of operators are concurrently assigned as a group, the traffic upon assignment and the processable traffic are associated with the group, and the determination unit 15 determines the timing to cancel the assignment of the group, based on the processable traffic associated with the group.

When the determination unit 15 determines that it is the timing to cancel the assignment of an operator, the notification unit 16 transmits an ID of the operator to the manager terminal 2 to notify the manager of the timing to cancel the assignment.

FIG. 4 is a diagram showing an example of a screen displayed on the manager terminal 2 according to the present embodiment.

In the present example, the screen displays a list of operators or operator groups who are temporarily assigned. For each of the operators or the operator groups, the screen displays an operator ID, an assignment sequence, traffic upon assignment, processing capacity, a status indicating whether currently being assigned, and a cancellation timing field indicating an operator or an operator group who is at the timing to cancel the assignment.

A method for notifying cancellation timing can be designed as appropriate, such as visual distinction by changing a display color or a font.

By selecting from this list, the manager determines an operator or an operator group whose assignment is actually canceled. More specifically, when an operator or an operator group is selected in the cancellation field, an instruction of canceling the assignment thereof is notified to the assignment management apparatus 1.

FIG. 5 is a graphic chart showing change in traffic per unit time, and timing of assignment and cancellation of operators, according to the present embodiment.

A period of time until time t1 is in an ordinary operational state where only previously scheduled operators are assigned. Subsequently, as the traffic per unit time increases, temporary operators A to D are sequentially assigned at time t1, t2, t3 and t4, respectively.

At this time, processing capacity α of an operator A is an amount of increase from the traffic per unit time at the time t1 when the operator A is assigned, to the traffic per unit time at the time t2 when an operator B is assigned. Similarly, processing capacity β of the operator B is an amount of increase from the traffic per unit time at the time t2 to the traffic per unit time at the time t3. Processing capacity γ of an operator C is an amount of increase from the traffic per unit time at the time t3 to the traffic per unit time at the time t4. It is assumed that processing capacity of an operator D is not calculated at the time t4, and data thereof in the past is not stored either.

Subsequently, the traffic per unit time reaches a maximum value, and is then reversed to a downward trend. At time t5, the traffic per unit time decreases to the traffic per unit time at the time t4 when the operator D was assigned, and there is made a notification that it is the timing to cancel the assignment of the operator D.

However, the manager does not follow the notification information, but maintains the assignment of the operator D, and cancels the assignment of the operator D at time t6.

At time t7, the traffic per unit time decreases from the traffic upon cancellation at the time t6 by the processing capacity $\gamma$ of the operator C, and there is made a notification that it is the timing to cancel the assignment of the operator C. The manager cancels the assignment of the operator C by following this notification information.

At time t8, the traffic per unit time decreases from the traffic upon cancellation at the time t7 by the processing capacity $\beta$ of the operator B, and there is made a notification that it is the timing to cancel the assignment of the operator B. The manager does not follow the notification information, but cancels the assignment of the operator B at time t9.

At time t10, the traffic per unit time decreases from the traffic upon cancellation at the time t9 by the processing capacity $\alpha$ of the operator A, and there is made a notification that it is the timing to cancel the assignment of the operator A. The manager does not follow the notification information, but cancels the assignment of the operator A at time t11.

When the assignment of all the temporary operators is canceled at the time t11, the ordinary operation is performed thereafter.

FIG. 6 is a flowchart showing a flow of processing when an instruction input for assigning an operator is accepted, in the assignment management apparatus 1 according to the present embodiment.

In Step S1, the assignment acceptance unit 12 acquires the traffic per unit time when the assignment is accepted, and stores the traffic per unit time and an assignment sequence into the assignment table 21 in association with an operator ID.

In Step S2, the processing capacity calculation unit 14 determines whether an operator, who is immediately earlier in the assignment sequence, has already been assigned. In a case in which the determination is YES, the processing advances to Step S3, and in a case in which the determination is NO, the processing is terminated.

In Step S3, the processing capacity calculation unit 14 calculates processing capacity of the operator who is immediately earlier in the assignment sequence, and stores the processing capacity into the processing capacity table 23.

FIG. 7 is a flowchart showing a flow of processing when an instruction input for canceling assignment of an operator is accepted, in the assignment management apparatus 1 according to the present embodiment.

In Step S11, the cancellation acceptance unit 13 acquires the traffic per unit time when the cancellation of the assignment is accepted, and stores the traffic as the traffic-upon-cancellation data 22.

In Step S12, the cancellation acceptance unit 13 updates an assignment cancellation flag, which corresponds to the operator whose assignment cancellation was accepted, from "not yet" to "done" in the assignment table 21.

In Step S13, in the assignment table 21, the cancellation acceptance unit 13 determines whether there is an operator whose assignment is not canceled after the operator whose assignment cancellation was accepted, in the assignment sequence. In a case in which the determination is YES, the processing advances to Step S14, and in a case in which the determination is NO, the processing is terminated.

In Step S14, regarding the operator who was determined to be later in the assignment sequence in Step S13, the cancellation acceptance unit 13 corrects the traffic upon assignment in the assignment table 21, by subtracting the processable traffic as the processing capacity of the operator whose assignment was canceled. Based on the traffic upon assignment thus corrected, the processing capacity is calculated, and the timing of cancellation is determined.

Figure 8:
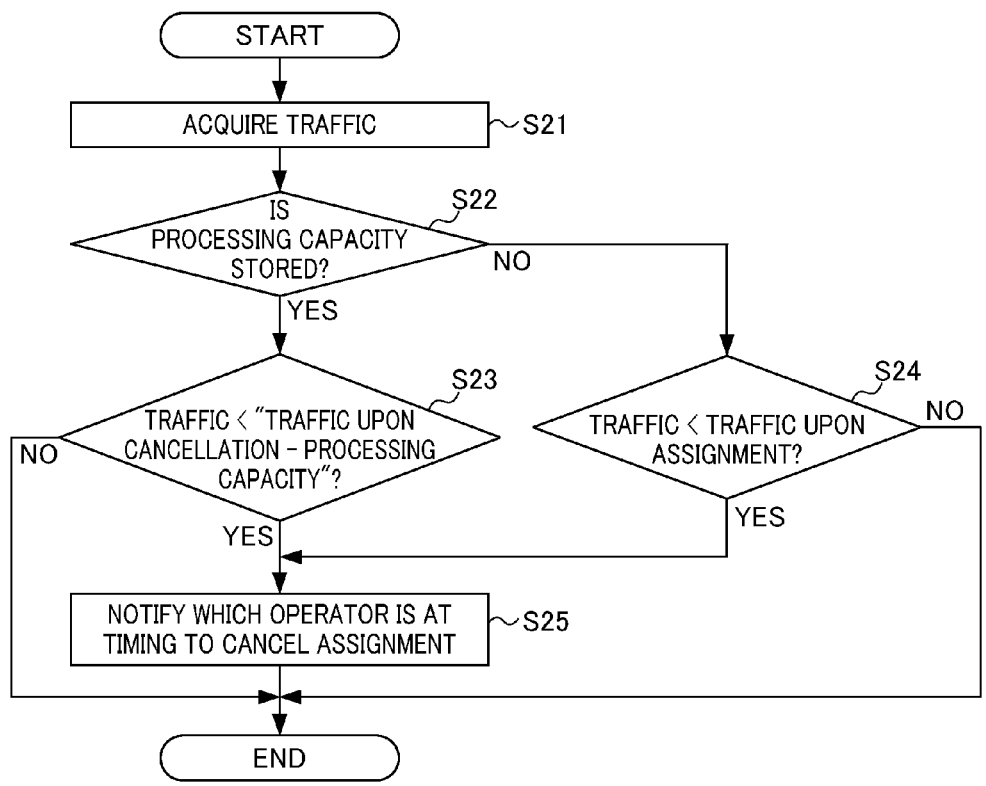
FIG. 8 is a flowchart showing a flow of processing for determining timing to cancel assignment of an operator, in the assignment management apparatus according to the embodiment.

FIG. 8 is a flowchart showing a flow of processing for determining the timing to cancel assignment of an operator, in the assignment management apparatus 1 according to the present embodiment.

The present processing is periodically executed at predetermined timing that is determined in advance.

In Step S21, the determination unit 15 acquires the current traffic per unit time from the traffic acquisition unit 11.

In Step S22, regarding an operator, for whom the timing to cancel the assignment will be determined, i.e. an operator being the last in the assignment sequence among the temporary operators whose assignment is not canceled yet, the determination unit 15 determines whether the processing capacity of this operator is stored in the processing capacity table 23. In a case in which the determination is YES, the processing advances to Step S23, and in a case in which the determination is NO, the processing advances to Step S24.

In Step S23, the determination unit 15 determines whether the traffic per unit time acquired in Step S21 is lower than "the traffic upon cancellation—the processing capacity". In a case in which the determination is YES, the processing advances to Step S25, and in a case in which the determination is NO, the processing is terminated.

In Step S24, the determination unit 15 determines whether the traffic per unit time acquired in Step S21 is lower than the traffic upon assignment, which is stored in the assignment table 21, of the operator who is the target of the determination. In a case in which the determination is YES, the processing advances to Step S25, and in a case in which the determination is NO, the processing is terminated.

In Step S25, the determination unit 15 determines that it is the timing to cancel the assignment of the target operator, and notifies the manager terminal 2 of the determination.

As described above, according to the present embodiment, the assignment management apparatus 1 can calculate the processable traffic for each of the operators or the groups composed of the plurality of operators, and can determine appropriate timing to cancel the temporary assignment of the operators or the groups, based on the processable traffic and the amount of change in the traffic per unit time.

At this time, the assignment management apparatus 1 determines the timing to cancel the assignment in the sequence reverse to the assignment sequence, and thus can notify the timing to cancel the temporary assignment in an appropriate sequence that is determined in advance.

Regarding an operator whose processable traffic is not calculated yet, the assignment management apparatus 1 can determine appropriate timing to cancel the temporary assignment of this operator, based on the traffic upon assignment.

The assignment management apparatus 1 stores the processable traffic that is calculated. Therefore, even in a case in which the processable traffic is not calculated afresh after assigning an operator last time, the assignment management apparatus 1 can determine appropriate timing to cancel the temporary assignment of the operator, by using the processable traffic calculated in the past.

The assignment management apparatus 1 may accept an instruction input for canceling assignment of an operator other than an operator being the last in the assignment sequence. In this case, regarding an operator who is later in the assignment sequence than the operator whose assignment was instructed to be canceled, particularly regarding the last operator whose processable traffic is not calculated yet, the assignment management apparatus 1 subtracts the traffic upon assignment thereof by the processable traffic of the operator whose assignment was instructed to be canceled. This improves the accuracy of calculating the processable traffic later.

Although the embodiment of the present invention has been described above, the present invention is not limited to the above embodiment. The effects described in the present embodiment merely list the most preferable effects that arise from the present invention, and the effects according to the present invention are not limited to those described in the present embodiment.

In the above embodiment, the traffic upon cancellation is stored as the traffic-upon-cancellation data 22, but the present invention is not limited thereto, and for example, the traffic per unit time upon cancellation of assignment of each operator may be stored, in place of the assignment cancellation flag of the assignment table 21. In this case, data is added to indicate which traffic is the latest traffic upon cancellation.

In the above embodiment, the notification unit 16 notifies the manager terminal 2 of the timing to cancel assignment of an operator, based on determination by the determination unit 15, but the present invention is not limited thereto. For example, by setting in advance, an automatic cancellation unit may automatically cancel assignment from the lastly assigned operator in sequence, based on determination by the determination unit 15. In this case, the traffic per unit time upon cancellation of the assignment is stored into the traffic-upon-cancellation data 22, and an assignment cancellation flag in the assignment table 21 is updated from "not yet" to "done" for the operator whose assignment was canceled.

The above assignment management apparatus 1 may be integrated with the manager terminal 2 or the outgoing/incoming call management server 3, or may be distributed as a plurality of servers.

The assignment management apparatus 1 may be any of various information processing apparatuses (computers) such as a server device or a personal computer (PC), and each of the aforementioned functions is implemented by software. In a case in which a function is implemented by software, a program composing the software is installed in an information processing apparatus. Such a program may be distributed by being recorded in a removable medium such as a CD-ROM, and may be distributed by being downloaded to an information processing apparatus through a network.

What is claimed is:

1. An assignment management apparatus, comprising:
   a traffic acquisition unit that acquires traffic per unit time at a contact center;
   a first storage unit that stores, for each of two or more temporarily assigned operators, the traffic per unit time at a time of assignment as traffic upon assignment of each operator in association with an identifier of each operator and an assignment sequence of each operator;
   a second storage unit that stores the traffic per unit time when assignment of any of the two or more operators is canceled, as traffic upon cancellation of the operator whose assignment is cancelled;
   a processing capacity calculation unit that calculates difference between the traffic upon assignment of a first operator of the two or more operators and traffic upon assignment of a second operator of the two or more operators whose assignment sequence is next to the first operator, as processable traffic that indicates a processing capacity of the first operator;
   a determination unit that determines that it is time to cancel assignment of the first operator, in a case in which the traffic per unit time is decreased by the processable traffic calculated for the first operator; and
   wherein the determination unit determines that it is time to cancel assignment in a sequence reverse to the assignment sequence.

2. The assignment management apparatus according to claim 1, wherein, in a case in which traffic per unit time fall below the traffic upon assignment of a last assigned operator of the two or more operators, whose processable traffic is not calculated, the determination unit determines that it is time to cancel assignment of the last assigned operator.

3. The assignment management apparatus according to claim 1, further comprising:
   a third storage unit that stores current processable traffic by updating processable traffic calculated in the past, each time the processing capacity calculation unit calculates the processable traffic,
   wherein the determination unit determines that it is time to cancel assignment of an operator from the two or more operators, based on the current processable traffic stored in the third storage unit.

4. The assignment management apparatus according to claim 1, wherein, in a case in which assignment of one of the two or more operators, other than an operator being last in the assignment sequence, is cancelled, the first storage unit updates traffic upon assignment for a last assigned operator whose processable traffic is not calculated, by subtracting processable traffic of the operator whose assignment is canceled.

5. The assignment management apparatus according to claim 1,
   wherein, in a case in which a plurality of operators are concurrently assigned as a group, the traffic upon assignment and the processable traffic are associated with the group, and
   wherein the determination unit determines that it is time to cancel the assignment of the group, based on the processable traffic associated with the group.

6. An assignment management method for a computer to manage assignment of operators at a contact center, the method comprising:
   a traffic acquisition step of acquiring traffic per unit time;
   a first storage step of storing, for each of two or more temporarily assigned operators, the traffic per unit time at a time of assignment as traffic upon assignment of each operator in association with an identifier of each operator and an assignment sequence of each operator;
   a second storage step of storing the traffic per unit time when assignment of any of the two or more operators is canceled, as traffic upon cancellation of the operator whose assignment is cancelled;
   a processing capacity calculation step of calculating difference between the traffic upon assignment of a first operator of the two or more operators and traffic upon assignment of a second operator of the two or more operators whose assignment sequence is next to the first operator, as processable traffic that indicates a processing capacity of the first operator;

a determination step of determining that it is time to cancel assignment of the first operator, in a case in which the traffic per unit time is decreased by the processable traffic calculated for the first operator; and wherein the determination step determines that it is time to cancel assignment in a sequence reverse to the assignment sequence.

7. A non-transitory computer-readable medium that stores an assignment management program causing a computer to manage assignment of operators at a contact center, the program causing the computer to execute:

a traffic acquisition step of acquiring traffic per unit time;

a first storage step of storing, for each of two or more temporarily assigned operators, the traffic per unit time at a time of assignment as traffic upon assignment of each operator in association with an identifier of each operator and an assignment sequence of each operator;

a second storage step of storing the traffic per unit time when assignment of any of the two or more operators is canceled, as traffic upon cancellation of the operator whose assignment is cancelled;

a processing capacity calculation step of calculating difference between the traffic upon assignment of a first operator of the two or more operators and traffic upon assignment of a second operator of the two or more operators whose assignment sequence is next to the first operator, as processable traffic that indicates a processing capacity of the first operator;

a determination step of determining that it is time to cancel assignment of the first operator, in a case in which the traffic per unit time is decreased by the processable traffic calculated for the first operator; and wherein the determination step determines that it is time to cancel assignment in a sequence reverse to the assignment sequence.

* * * * *